(12) United States Patent
Gentzsch

(10) Patent No.: US 10,228,031 B2
(45) Date of Patent: Mar. 12, 2019

(54) ELECTROHYDRAULIC BRAKE RELEASE DEVICE AND BRAKE SYSTEM

(71) Applicant: PINTSCH BUBENZER GMBH, Kirchen-Wehbach (DE)

(72) Inventor: Iris Gentzsch, Bad Krozingen (DE)

(73) Assignee: PINTSCH BUBENZER GMBH, Kirchen-Wehbach (DE)

(*) Notice: Subject to any disclaimer, the term of this patent is extended or adjusted under 35 U.S.C. 154(b) by 0 days.

(21) Appl. No.: 14/893,779

(22) PCT Filed: May 27, 2014

(86) PCT No.: PCT/EP2014/060921
§ 371 (c)(1),
(2) Date: Jan. 28, 2016

(87) PCT Pub. No.: WO2014/191395
PCT Pub. Date: Dec. 4, 2014

(65) Prior Publication Data
US 2016/0146275 A1    May 26, 2016

(30) Foreign Application Priority Data
May 28, 2013  (DE) .................. 10 2013 105 446

(51) Int. Cl.
*F16D 59/02* (2006.01)
*B60T 17/02* (2006.01)
(Continued)

(52) U.S. Cl.
CPC .............. *F16D 59/02* (2013.01); *B60T 13/26* (2013.01); *B60T 13/261* (2013.01);
(Continued)

(58) Field of Classification Search
CPC .. F15B 9/00; F15B 15/18; F16D 59/02; B60T 13/26; B60T 13/261; B60T 13/662; B60T 13/683; B60T 15/027; B60T 17/02
(Continued)

(56) References Cited

U.S. PATENT DOCUMENTS

| | | |
|---|---|---|
| 1,993,613 A | 12/1929 | Lum |
| 6,519,939 B1 | 2/2003 | Duff |
| 2003/0077183 A1* | 4/2003 | Franchet ................. F15B 7/006 417/269 |

FOREIGN PATENT DOCUMENTS

| | | |
|---|---|---|
| DE | 20 37 626 A1 | 2/1972 |
| DE | 21 03 701 A1 | 8/1972 |

(Continued)

OTHER PUBLICATIONS

Search Report for International Application No. PCT/EP2014/060921, dated Jan. 22, 2015.
(Continued)

*Primary Examiner* — Melanie Torres Williams
(74) *Attorney, Agent, or Firm* — Pearl Cohen Zedek Latzer Baratz LLP

(57) ABSTRACT

The invention relates to an electrohydraulic brake release device (1) comprising an actuating cylinder arrangement (400), a tank module (300) for receiving a hydraulic medium, an electric drive unit (200) and a functional unit (100) having a pump assembly (113). The pump assembly (113) is arranged in a recess (111) provided in the functional unit (100), which recess is in communication with the tank module (300), is functionally connected to the actuating cylinder arrangement (400) by way of a conduit arrangement (150, 160, 170, 171, 172, 180, 190) and by way of a bearing carrier cover (115) is sealed off from a dry-running drive motor (210, 211) of the electric drive unit (200). The
(Continued)

invention further relates to a brake system comprising a brake release device of this kind.

19 Claims, 9 Drawing Sheets

(51) Int. Cl.
  *B60T 13/26* (2006.01)
  *B60T 13/66* (2006.01)
  *B60T 13/68* (2006.01)
  *B60T 15/02* (2006.01)

(52) U.S. Cl.
  CPC .......... *B60T 13/662* (2013.01); *B60T 13/683* (2013.01); *B60T 15/027* (2013.01); *B60T 17/02* (2013.01)

(58) Field of Classification Search
  USPC .......................................... 60/475
  See application file for complete search history.

(56) References Cited

FOREIGN PATENT DOCUMENTS

| | | | |
|---|---|---|---|
| DE | 2103701 A1 | 8/1972 | |
| DE | 7001159 U | 12/1972 | |
| DE | 3607419 C1 | 1/1987 | |
| DE | 3635694 A1 | 5/1988 | |
| EP | 0395420 A2 * | 10/1990 | .............. F15B 15/18 |
| GB | 1276246 A | 6/1972 | |
| GB | 2120322 A | 11/1983 | |
| JP | S58-203204 A | 11/1983 | |
| JP | H02-085003 U | 3/1990 | |
| JP | 2002/240788 A | 8/2002 | |

OTHER PUBLICATIONS

Office Action for Chinese Patent Application No. 201480038843.9, dated May 2, 2017.
Office Action for Japanese Patent Application No. 2016-516122, dated Feb. 14, 2017.

* cited by examiner

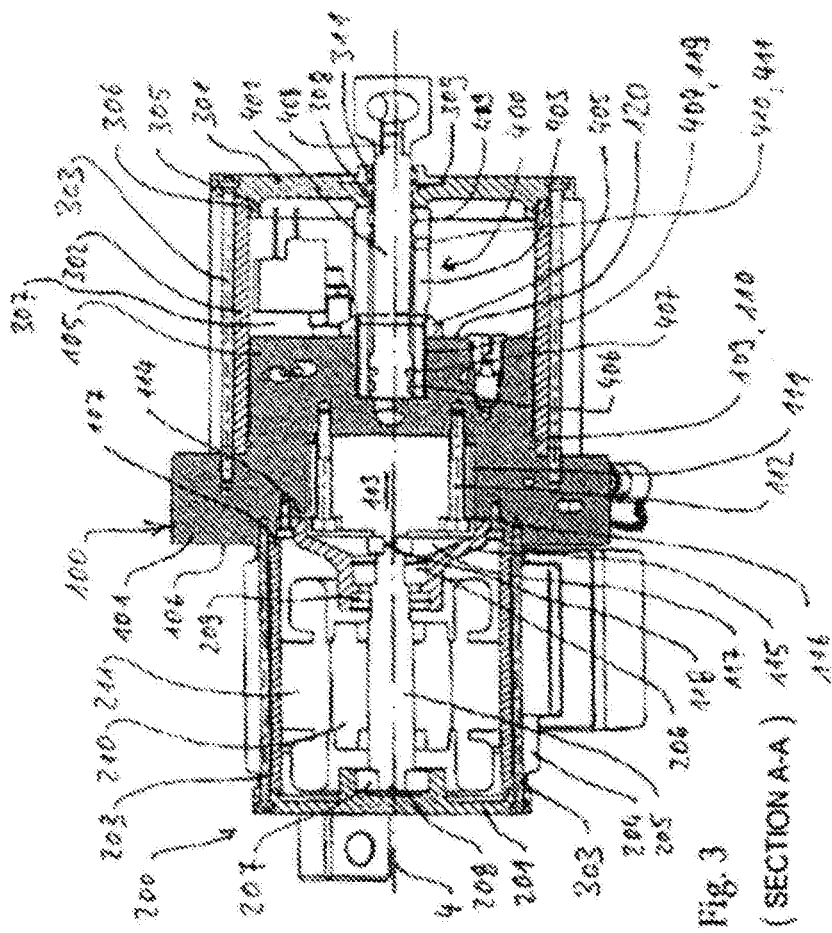
Fig. 3 (SECTION A-A)
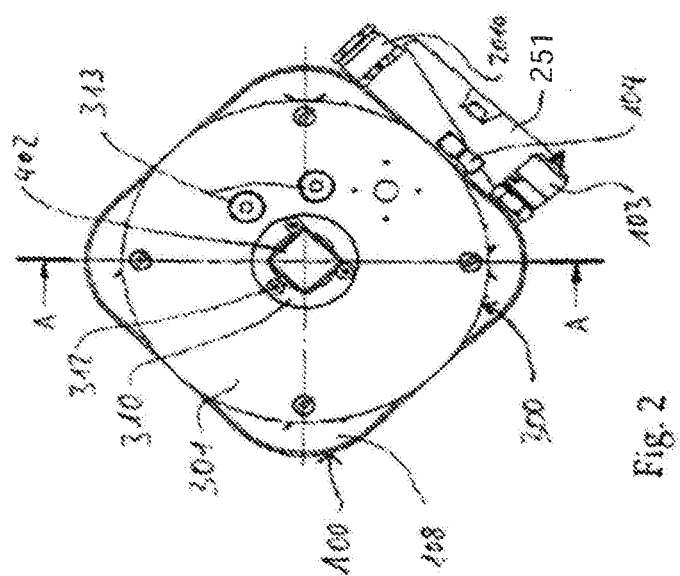
Fig. 2

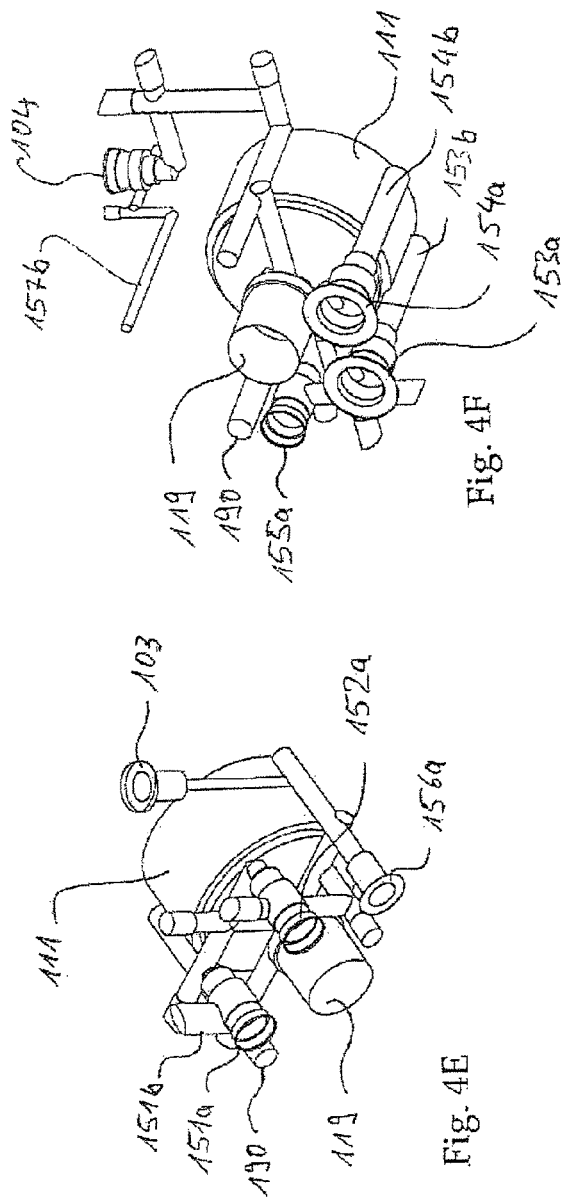

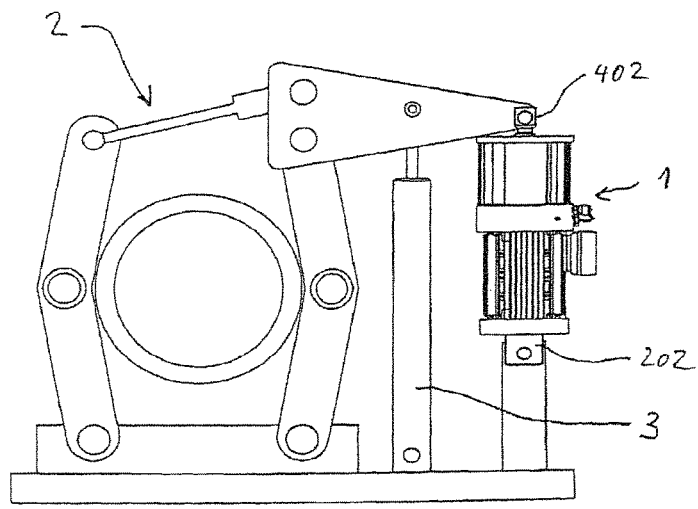
Fig. 7
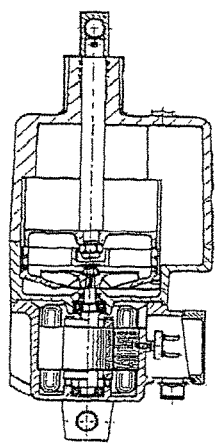
Fig. 8A ( State of the Art )
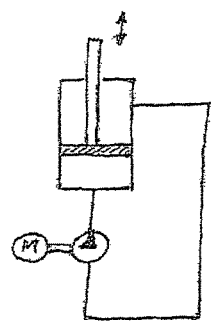
Fig. 8B ( State of the Art )

ELECTROHYDRAULIC BRAKE RELEASE DEVICE AND BRAKE SYSTEM

CROSS-REFERENCE TO RELATED APPLICATIONS

This application is a National Phase Application of PCT International Application No. PCT/EP2014/060921, International Filing Date May 27, 2014, claiming priority of German Patent Application No. 10 2013 105 446.3, filed May 28, 2013, which is hereby incorporated by reference.

FIELD OF THE INVENTION

The present invention relates to an electrohydraulic brake release device. The invention also relates to a brake system, in particular in industrial braking installations.

BACKGROUND OF THE INVENTION

In the industrial sector there is a plurality of spring-loaded braking systems where a spring force acts on brake elements via a power-reinforcing lever system, said brake elements, in turn, engaging a corresponding brake block (e.g. a disk or a drum). Such industrial brakes are made e.g. as disk brakes, drum brakes and also as barrel tensioners. They are widely used in the conveyor technique, e.g. in conveyor belt systems, crane systems, conveyor systems and hoisting systems, etc. They are usually designed as safety brakes and operate according to the fail-safe principle. This means that the brakes are designed in such a way that they are automatically applied in a breakdown, e.g. in the case of a power failure, and stop the moving parts to be decelerated as quickly as possible or keep them in a certain position (e.g. in the case of hoisting gears or elevators).

For this purpose, it is initially necessary to keep the brakes in an open, i.e. released, state. This is achieved by what is called brake release devices which, in an activated state, operate against the brake spring force, eliminate the latter, open the brake and keep it in the (open) released state. This is often achieved by electrohydraulic brake release devices which act on the brake lever arrangement in parallel to the brake spring.

They operate according to the following principle: For releasing, a drive (usually an electric motor) is set in motion. This drive acts on a rotary pump which, during operation, pressurizes and conveys a hydraulic medium which, in turn, acts on a cylinder piston surface that is coupled to the brake lever arrangement via an actuating rod. In this connection, a certain pressure acts on the actuating piston surface at a certain speed and said pressure, in turn, applies a certain actuating force to the arrangement and neutralizes the (re-storing) force of the brake spring.

The pumps used in this connection are usually rotary pumps which have to be actuated in continuous operation when the brake is released. During braking, the drive is stopped, the rotary pump is at a stand-still and the hydraulic medium flows through the rotary pump back into a reservoir, the actuating cylinder is pushed back by the brake spring and the brake meshes or "is applied".

Such brake release devices (cf. FIGS. 8A and 8B) have a simple configuration and offer a high operational reliability. However, they also have a number of drawbacks: The pressures which can be applied in continuous operation by means of rotary pumps are relatively low. As a result, the effective surfaces on the actuating pistons must be relatively large and therefore the required brake release devices also have to be relatively large. In continuous operation, the drives are continuously loaded and therefore have to be designed for very long operation times as well. In order to release a brake, relatively large volumes of hydraulic medium have to be moved. This prolongs the actuation cycles that can be realized, and therefore such brake release devices can only be used to a limited extent for very short release and braking intervals. In order to minimize the problems occurring on shaft seals in continuous operation, the electric motors are operated in a hydraulic medium (what is called wet runners). However, this means that, in order to maintain the motors, the hydraulic liquid must initially be fully removed. The continuous operation required for the release also causes thermal problems. In particular, the overall size, the weight and the problems existing in connection with the continuous operation are considered to be disadvantageous.

One approach may be to run a brake release device in intermittent operation, i.e. after building up a certain operating pressure on the cylinder, said pressure is kept constant via suitable switch valves and is reduced again during braking. However, this requires additional line and valve arrangements on the brake release device.

Therefore, the object is to realize a brake release device which eliminates at least in part the above mentioned drawbacks.

SUMMARY OF THE INVENTION

This object is achieved by the brake release device of claim 1. According to a first aspect of the invention, a brake release device is provided which includes the following: an actuating cylinder arrangement, a tank module for receiving a hydraulic medium, an electric drive unit and a functional unit having a pump assembly, wherein the pump assembly is arranged in a recess which is formed in the functional unit and which is in communication with the tank module, is functionally connected to the actuating cylinder arrangement via a line arrangement and is sealed off from a dry running drive motor of the electric drive unit by means of a bearing carrier cover.

Further aspects and features of the present invention follow from the dependent claims, the appending drawing and the below description of preferred embodiments.

BRIEF DESCRIPTION OF THE DRAWING

Embodiments of the invention are now described by way of example and with reference to the figures, wherein:

FIG. 2 is a front view of the brake release device shown in FIG. 1;

FIG. 3 is a longitudinal sectional view (section A-A) of the brake release device from FIGS. 1 and 2;

FIGS. 4A to F are perspective negative presentations of different areas in different presentations of the line arrangement formed in the functional unit;

FIG. 7 is a schematic diagram of a brake system including the release device according to FIG. 1;

FIGS. 8A and 8B are a prior art release device including the circuit diagram thereof.

DETAILED DESCRIPTION OF THE INVENTION

Figure 1:
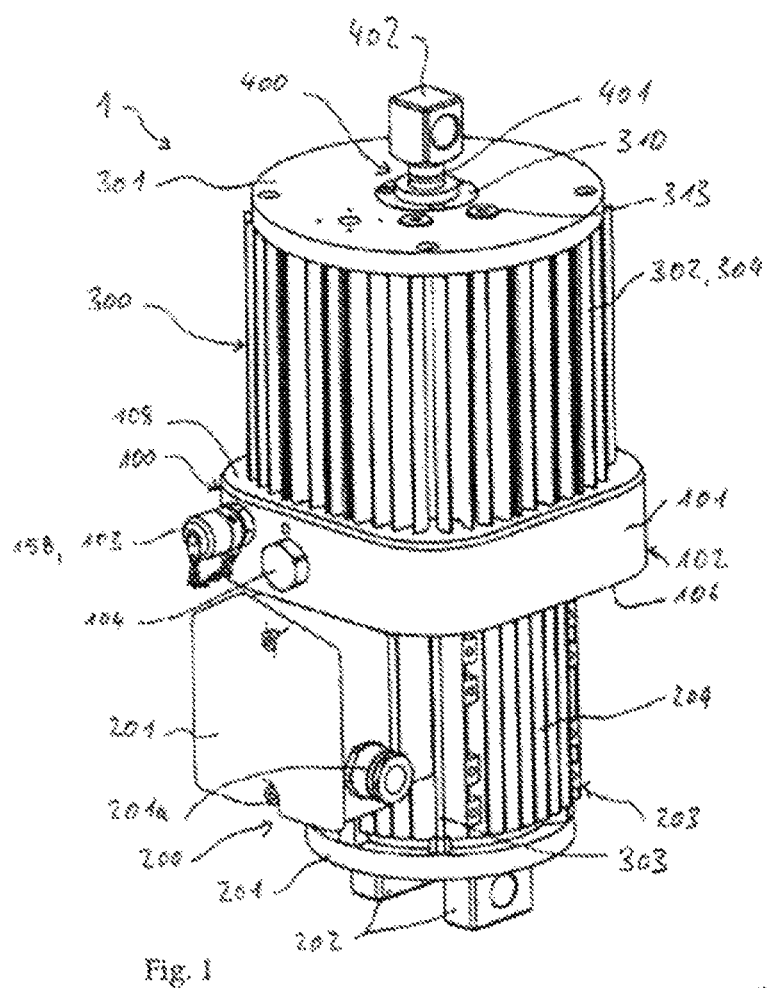
FIG. 1 is a perspective view of a brake release device according to the invention.

In particular FIGS. 1, 2, 3 and FIGS. 5A and 6 illustrate an embodiment in conformity with the present invention. General explanations on the embodiments are initially provided, followed by a detailed description.

The brake release device according to the invention is in particular characterized in that the pump assembly is arranged in a recess which is formed in the functional unit and which, on the one hand, is in communication with the tank module and, on the other hand, is functionally connected to the actuating cylinder arrangement via a line arrangement and is finally sealed off from a dry-running drive motor of the electric drive unit by means of a bearing carrier cover.

This combination of features allows that the pump assembly can be integrated, without a hydraulic housing of its own, directly into the functional unit. Due to the communication with the tank module, hydraulic medium is directly supplied to the pump assembly, and the actuating cylinder arrangement can be hydraulically actuated by means of the pump assembly action via the line arrangement which is also connected to the recess. In this connection, the bearing carrier cover prevents hydraulic medium from reaching the dry-running, electric drive motor and/or the drive unit. In this way, the electric drive unit can be arranged directly on the pump assembly and is simultaneously protected from hydraulic medium. As a result, it is possible to carry out maintenance work on the electric drive unit at regular intervals without having to previously drain the hydraulic medium and/or replenish it again before the brake release device is operated again. This also eliminates a time-consuming and error-prone release of the line arrangement prior to the start-up operations which might be additionally complicated as a result of the installation position of the brake release device.

In one embodiment, the bearing carrier cover is designed in such a way that a shaft driving the pump assembly passes therethrough. This design enables several alternatives for coupling the electric drive unit to the pump assembly:

One option is that the driving shaft is simultaneously a component of the electric drive unit and of the pump assembly.

In another embodiment, the output end of the input shaft of the electric drive unit can also protrude through the bearing carrier cover into the recess where it can be coupled to the input end of the pump assembly via a suitable coupling in such a way that the rotary motion of the input shaft is transmitted to the pump assembly.

Similarly there are also embodiments where the input shaft of the pump assembly protrudes beyond the recess and through the bearing carrier cover into the dry-running area of the drive motor where it is connected to the input end of the motor shaft.

In another embodiment, the bearing carrier cover comprises a bearing arrangement carrying the shaft, e.g. a suitable antifriction bearing which is made as a fixed or movable bearing.

A particularly compact, operationally reliable and simultaneously variable embodiment of the brake release device is obtained when the functional unit is made as an integral functional block in which an actuating cylinder support for receiving the actuating cylinder arrangement, the recess for the drive unit and the line arrangement are formed in one piece. Short line distances and low line elasticities thus enable a very effective pressure regulation and a reliable pressure application of the actuating cylinder arrangement.

In one embodiment, the latter is fixed in a force-fit and detachable way in the actuating cylinder support via its cylinder pipe. Therefore, the guiding and actuating forces which act on the actuating cylinder arrangement during operation, can be introduced in a particularly safe manner directly into the functional block and be transmitted via the latter into corresponding coupling means (e.g. on the housing of the electric drive unit).

In this connection, there is an embodiment where the functional unit and/or the functional block have two end faces. The tank module and the actuating cylinder arrangement are arranged on the functional unit via one end face. The other end face receives the electric drive unit and the pump assembly.

The line arrangement which can be designed in accordance with the desired embodiment extends between the two end faces and in particular between the pump assembly in the recess thereof and the actuating cylinder arrangement in the support thereof as well as the tank module.

A particular lean embodiment is possible if the two end faces are arranged in such a way that they face away from each other, and therefore the electric drive unit and the pump assembly, on the one hand, and the actuating cylinder arrangement and the tank module, on the other hand, are arranged coaxially in relation to a main axis. With such an arrangement, e.g. the actuating forces are then transmitted between the actuating cylinder arrangement and an electric drive unit housing which is also coupled to the functional unit/the functional block.

If the end faces are arranged at right angles, the actuating forces can also be transmitted directly between the actuating cylinder arrangement and the functional unit/the functional block. It is thus possible to realize a particularly short release device.

In order to conduct an energy-saving intermittent operation with "fail safe" function, it is provided that the pump assembly is coupled to the actuating cylinder arrangement via a check valve. As a result, the pump assembly can be switched off in the extended position of the actuating cylinder arrangement and at a certain pressure without hydraulic medium flowing back into the pump assembly, thus influencing the position of the actuating cylinder arrangement. The "fail safe" function is realized by connecting the actuating cylinder arrangement to the tank module via a branch point and a 2/2-way valve opened without current. This guarantees that in an emergency situation (e.g. power failure, functional error) the 2/2-way valve always reaches its open position and hydraulically connects the actuating cylinder arrangement to the tank module in such a way that a brake spring moves the brake into its closed position and, in doing so, returns the hydraulic medium from the actuating cylinder arrangement into the tank module. If a plurality (at least two) of 2/2-way valves is provided, the operational reliability is increased as a result of the redundancy to guarantee a reliable "fail-safe" operation even if one of the 2/2-way valves becomes inoperative.

Excess pressures in the system are prevented by a pressure limiting valve which ensures, at an overly large pressure, a return flow of the hydraulic medium between the pump assembly and the check valve via a branching channel.

This serves for preventing overloads of the hydraulically applied components of the brake release device.

One arrangement accommodates a press key which operates between check valve and actuating cylinder arrangement and which is used for controlling the pump assembly and/or the electric drive unit. When a certain threshold value (upper pressure threshold value) is exceeded, the electric drive unit, and thus also the pump assembly coupled thereto, is switched off whereas when the pressure falls below a further threshold value (lower pressure threshold value) they are taken into operation again to compensate for the pressure drop between the upper and lower pressure threshold values and to keep the actuating cylinder arrangement in the release position in which it tensions a brake spring.

In one arrangement, in which the check valve, 2/2-way valve, pressure limiting valve and/or press key are arranged in the tank module, these elements can be protected in a particularly good way and can optionally also be cooled in a particularly good way, namely by bathing the elements in hydraulic liquid which dissipates the operating heat. This applies in particular to the electromagnetically operated 2/2-way valves.

In one embodiment, all necessary control and supply lines, i.e. power and signal lines, are guided by means of a removable, sealing cable passage via the electric drive unit through the functional unit/the functional block into the tank module where they can then be connected to the corresponding components. The lines can be pre-assembled in the cable passage, inserted in the functional unit and sealed and can then be connected to the corresponding functional elements in the tank module and be made externally accessible in the electric drive unit via a switch box. The removable cable passage is here designed in such a way that it seals off the tank module from the electric drive unit.

Furthermore, the invention relates to a brake arrangement having a brake release device according to the invention.

A functional unit for such a brake release device is particularly characterized by designing it as an integral functional block which accommodates both the cylinder support, the recess for receiving a pump assembly and all channels which are necessary for the hydraulic functions and form a line arrangement.

This special design has several advantages: It enables a very compact, stable and functionally reliable design. The pump assembly, which is made e.g. as a gear pump, can therefore be arranged without a housing of its own in the functional block which can be provided with supply openings (pump inlet) and discharge openings (pump outlet) at suitable locations.

Since all necessary lines are formed in the functional block, sealing problems are reduced to a minimum.

The cylinder support formed in the functional block enables a mechanically and hydraulically effective fixation of the actuating cylinder arrangement which, on the one hand, is suitable for a high-pressure operation and, on the other hand, reliably transmits the mechanical loads (transverse and axial loads) into the functional block which can simultaneously take over a structural core function of the brake release device, namely the power transmission in the installed state and in particular in the release position.

Since all hydraulic medium-conducting lines and channels are also formed in the functional block, the system elasticity is reduced, in particular in the pressurized lines; on the one hand, since the line distances per se can be very short and, on the other hand, since line elasticities, which can occur in separate, relatively flexible and elastic hydraulic lines or tubes are virtually irrelevant.

In one embodiment, the cylinder support is provided with a sealing area which surrounds the cylinder support and which serves for connecting a tank module. This embodiment makes it possible to provide the hydraulic medium in the vicinity of the consumer in a very space-saving and particularly operationally reliable way since it is thus possible to realize a storage room which largely coaxially surrounds the actuating cylinder arrangement and which supplies the hydraulic medium directly at the functional unit which can be provided with corresponding supply openings. Separate feed lines can be fully omitted. In addition, the hydraulic medium can also be provided in a largely position-independent way, i.e. both with upright brake release devices and horizontal brake release devices.

It is here also possible to realize a mechanically highly durable coupling by the intimate connection of the tank module to the functional unit and/or the functional block. As a result, the tank module per se can optionally also be realized as a load-receiving and/or load-transmitting component for transverse and conducting forces.

There is an embodiment where this is realized in a similar way for a housing assembly. Here, a support or support area is provided and surrounds the recess for receiving the pump assembly. It is thus possible in a particularly easy way to arrange the drive unit in a precisely adjusted position in relation to the pump assembly. The drive housing assembly can thus also take over load-receiving and/or load-transmitting functions without the drive unit accommodated therein having to transmit the loads caused by the actuating forces.

In one embodiment where the actuating cylinder support is formed in a base segment of the functional block, said base segment extending inside the sealing area, the overall length of the brake release device can be further reduced. This base then protrudes into the tank module.

In addition, this simplifies the supply and discharge of hydraulic medium to and from the tank, respectively. In such an embodiment, appropriate supply or discharge openings are not only limited to openings in the tank-side end face of the base but can also be realized in openings and/or channels exiting the side faces of the base. This is also particularly advantageous in the case of different installation positions of a brake release device (horizontal or vertical).

In one embodiment, the relevant valve connections which are optional or required for the control of the brake release device and in which the necessary control valves and/or measurement elements are arranged, are formed in an end face of the base. This arrangement enables an arrangement of these components which is easy to assemble and easy to maintain. When the tank module is removed, they can easily be installed and removed and/or adjusted. It is even possible, to perform certain adjustment work on these components through appropriate (closable) openings in the tank module. From a production-oriented point of view, this arrangement also offers advantages since all necessary valve seats having corresponding connection threads can be formed in a clamping at the functional block.

In one embodiment, a valve connection for receiving a check valve is provided. This check valve serves for preventing the return flow of the hydraulic medium which is conveyed from the pump assembly to the actuating cylinder arrangement. The check valve can be made in the seat design which can be assembled in a particularly simple way and operates in a channel/line section which is formed between the pump outlet and an inlet in the support of the actuating cylinder arrangement.

In one embodiment, at least one second valve support is also provided between cylinder support and sealing area, said valve support being intended for receiving a 2/2-way valve. Such a 2/2-way valve, which is also developed as a seat valve, guarantees in an open rest position that the hydraulic medium can flow from the actuating cylinder arrangement back into the tank module. In an excited state (electromagnetically actuated), it adopts its locked position and prevents a return flow, i.e. it acts as a load holding valve in a channel/line section between the actuating cylinder arrangement and/or the check valve and the tank module. The arrangement of the valve support in this area enables a simple connection to the valve connection of the check valve and the cylinder support via axially or transversely extending bores.

In another embodiment, two such valve supports are provided, each receiving a corresponding 2/2-way valve. The redundant arrangement guarantees that, even if one of these valves becomes inoperative, the actuating cylinder arrangement is reliably load-relieved in an emergency (open without current) and the release device releases the brake spring and enables an application of the brake. The two valve supports can be arranged next to each other and thus be connected in parallel in a particularly simple way.

In another embodiment, a fourth valve support for receiving a throttle valve is provided. Such an, optionally adjustable, throttle valve can influence the actuating characteristics during braking via the flow-through at the throttle valve. Such a throttle valve acts between the actuating cylinder arrangement and one or both 2/2-way valves. It is thus possible to realize application characteristics controlled in multifarious ways by actuating either only one or both 2/2-way valves and to realize different and optionally adjustable flow cross-sections via the throttle valve.

There are embodiments which provide a press key support. A press key used therein receives the pressure applied to the actuating cylinder arrangement in the hydraulic medium, outputs a switch signal to a control unit when a certain operating pressure (threshold value) is exceeded, and said control unit then switches off the drive motor and thus the pump assembly. When the pressure falls below a lower threshold value, the drive, and thus the pump, is started again to compensate for the pressure loss, e.g. caused by leakages, and to keep the actuating cylinder arrangement in its operating position.

In another embodiment, a cable channel opening between cylinder support and sealing area as well as between recess and housing connection passes through the functional unit. This cable channel extends in a fully independent way from the channels forming the line arrangement and serves for guiding control and measuring signal lines from the tank area into the drive housing assembly where it can then be guided jointly with the connection lines for an electric motor into a connection box/switch box. A hermetically sealed cable passage can serve for sealing purposes and is provided with a barrier through which the hydraulic medium cannot pass.

With respect to FIG. 1, this figure shows in a perspective view a brake release device 1 and its main components, namely the functional unit 100, an electric drive unit 200 and a tank module 300 through which an actuating cylinder arrangement 400 passes. Two connection lugs 202 are formed at the bottom 201 of the electric drive unit 200. The actuating piston 401 of the actuating cylinder arrangement 400 passes through the cover 301. At its end, said piston also has a connection lug 402. In FIG. 1, the actuating piston 401 is shown in its rest position, i.e. in its retracted position.

A connection box 251 having a line supply is mounted laterally on the electric drive unit 200. The functional unit 100 has a central flange 101, the exposed, lateral peripheral surface 102 of which is provided with two connections 103, 104, the function and task of which are explained below.

During operation, the brake release device 1 is adjustable between the rest position as shown and an operating position, in which the actuating piston 401 is extended. For this purpose, the brake release device 1 is coupled to the connection lugs 402 and 202 by means of a brake lever mechanism 2, and therefore the brake blocks are in their release position, i.e. in a non-applied position, when the actuating piston 401 is extended. In this connection, a spring 3 acting parallel to the brake release device 1 is tensioned and exerts a brake force on the brake lever arrangement 2 as soon as the actuating piston 401 reaches its rest position for braking (cf. FIG. 7).

FIG. 3 shows the inner configuration of the brake release device 1.

The functional unit 100 is formed as an integral functional block which has a flange 101 which includes a base area having the shape of a rounded square and from which a base 105 having a circular cross-section runs in an axial direction of the brake release device 1 (along the central axis 4) into the tank module 300.

The electric drive unit 200 is fixed to the drive-side end face 106 of the functional block 100 via pre-stressed anchors 303 which pass through the cover 201 and are fixed in corresponding blind holes in the functional block 100. In this connection, the housing body 203, which has a tubular shape and cooling fins 204 on the exterior surface thereof, is clamped between a housing connection 107 formed on the functional block 100 and the bottom 201.

On the opposite side, the tubular tank body 302 is clamped in the same way between the cover 301 and the tank-side end face 108 of the flange 101 via similar pre-stressed anchors 303. The tank body 302 also has cooling fins 304.

The base 105 here protrudes into the tank body 302 and has a sealing area 109 in the vicinity of the transition to the end face 108. In the sealing area, a radial seal 110 formed as an O-ring seals off the interior of the tank body 302 on the interior surface of the tank body 302 from the surroundings. The cover 301 is likewise sealed via a collar 305 protruding into the tank body 302, said collar having another radial seal 306 on the outer periphery thereof.

A recess 111 is developed in the drive-side end face 106 of the functional block 100 centrally in the housing connection 107, said recess serving for receiving the pump assembly 113 fixed by means of screws 112. A receiving surface 114 is developed between the recess 111 and the housing connection 107, said receiving surface being lowered in relation to the end face 106 and serving for receiving a bearing carrier cover 115, which is screwed to the functional block 100 by means of screws 116 and has a circumferential sealing chamber in the end face thereof, said chamber sealing off the interior of the bearing carrier cover 115 from the interior of the housing body 203 of the electric drive unit 200. In the functional block 100, the bearing carrier cover 115 forms together with the recess 111 a chamber 117 which is rinsed with hydraulic medium. The bearing carrier cover 115 serves for receiving the input shaft 205, the pump-side end of which is received in a fixed bearing 206 formed as an antifriction bearing and the other end of which is received in the bottom 201 of the electric drive unit 200 via a movable bearing 207 which is also formed as an antifriction bearing and which is axially slidable via a cup spring 208. Furthermore, shaft seals 209 seal off the input shaft 205 towards the chamber 117.

A rotor 210 which is driven via the stator windings 211 anchored in the housing body 203 is seated on the input shaft 205 in a rotationally fixed fashion. The rotor 210 and the stator windings 211 form the electric drive motor.

The output-side end of the input shaft 205 is coupled to the input end of the pump assembly 113 via a slot coupling 118. This slot coupling 118 serves for compensating for a small offset between the input shaft 205 and the input end of the pump assembly 113 and represents an easy-to-assemble coupling between the input shaft 205 and the input end of the pump assembly. It is arranged in chamber 117.

The bearing of the drive shaft 205 of the electric drive unit 200 in the sealed bearing carrier cover 115 enables the electric motor to be operated in a dry state. Since the chamber 117 per se is rinsed with hydraulic medium, both the antifriction bearing 206 and the slot coupling 118 are lubricated during operation.

The pump assembly 113 is formed as an internal gear pump which axially sucks in the hydraulic medium from chamber 117 which is supplied with hydraulic medium via the recess 111 and discharges it in an axial fashion (see below). Gear pumps and in particular internal gear pumps have a very small pulsation, have a low noise level and a long service life. They can be used in pressure ranges of about 5 to over 250 bar and enable a delivery volume of about 2 to 4 liters/min.

The actuating cylinder arrangement 400 is fixed coaxially to the recess 111 via its cylinder pipe 403 by means of an external thread 404 in a corresponding cylinder support 119 in the functional block 100 or in the base 105. The cylinder pipe 403 protrudes into the interior 307 of the tank body 302 and ends close to the inner side of the cover 301. The installation position of the cylinder pipe 403 is fixed via a counter nut 405. The actuating piston 401 runs in the cylinder pipe 403 and the end thereof, which protrudes into the cylinder support 119, has circumferential grooves for receiving a guiding ring 406 and a sealing ring 407.

The opposite actuating end 408 protrudes from the cylinder pipe 403 and passes through the cover 301 to the outside. The end of the cylinder pipe 403 accommodates a groove for receiving a guiding ring 409 and a plurality of wreathlike bores 410 for receiving an inductive sensor 411 which monitors the position of the actuating piston 401 in the cylinder pipe 403 and detects the operating position (extended position) of the actuating piston 401 and outputs a corresponding signal. Since several wreathlike bores 410 are provided, the inductive sensor can be arranged, irrespective of the installation turning position of the cylinder pipe 403, in the bore 410 where it can be provided with a connection line in favorable fashion.

Another guiding ring 308 and a sealing ring 309 are arranged in the cover 301. The sealing ring 309 is fixed by means of a disk 310 which additionally carries a dirt wiper 311 that protects the sealing ring 309 and the guiding ring 308 from externally penetrating abrasive substances (dust, etc.). The disk 310 is fixed in the cover 301 by means of screws 312 (cf. FIG. 2).

Figure 6:
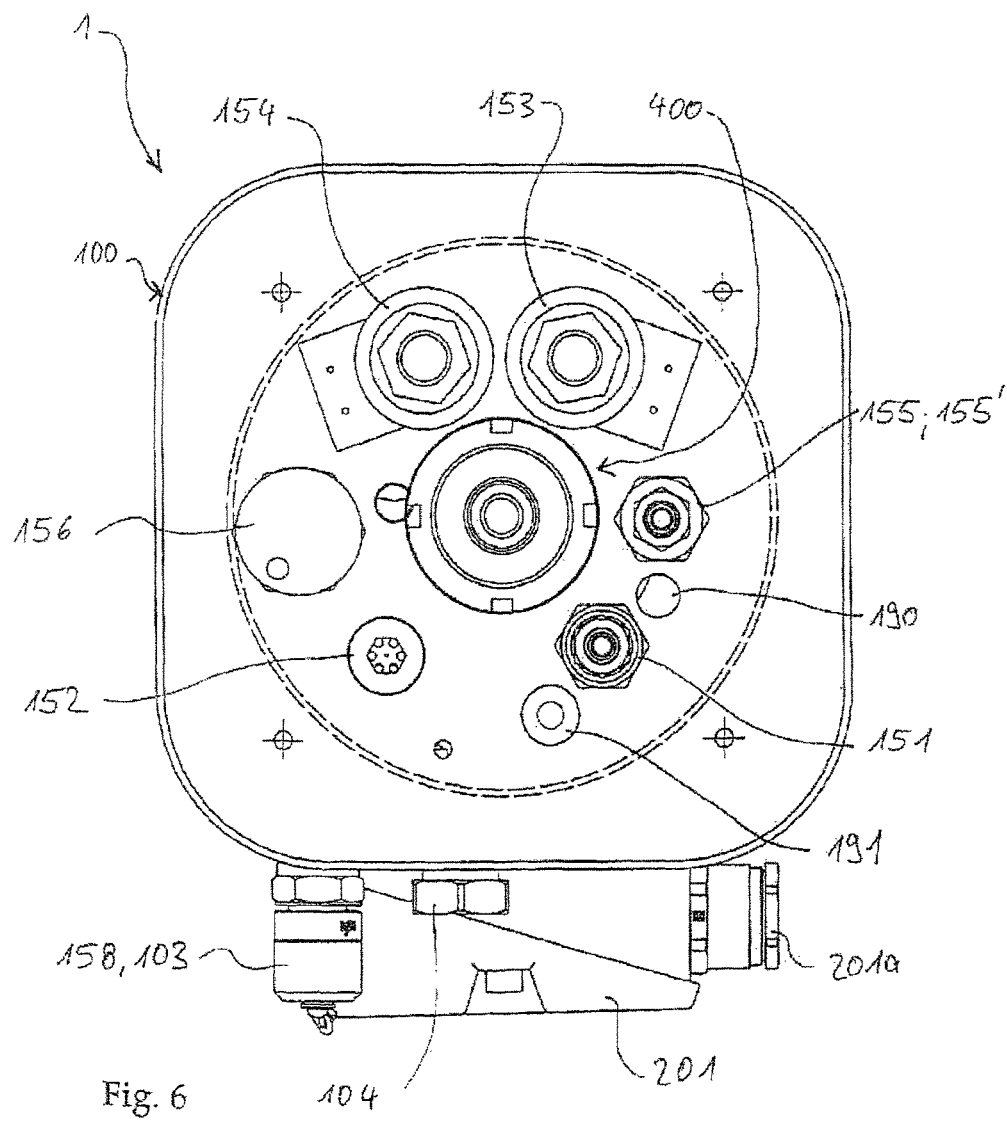
FIG. 6 is a front view of the brake release device shown in FIG. 1 without a tank module.

A plurality of valve supports and/or connections are provided in the tank-side end face 120 of the base 105 in addition to the cylinder support 119 and their function is described below in conjunction with FIGS. 4A-4F. These valve supports carry a plurality of functional elements which are wet by the fluid medium and are disposed inside the interior 307 of the tank module 300 where they are accommodated in such a way that they are well protected from external influences. The arrangement of the valves in the end face 120 of the base 105 is illustrated in FIG. 6.

For the purpose of adjustment, they can be made accessible in part via screw caps 313 in the cover 301. Both the switching elements and the inductive sensor 411 are in part provided with control and power connections. The associated lines are passed through the functional block 100 and into the housing body 203 of the electric drive unit 200 from where they are guided into the connection box 251. More detailed observations are made thereon below.

During the operation of the brake release device, the pump assembly 113 is set in motion via the electric drive unit 200, the supplied hydraulic medium is pressurized and pumped into the cylinder support 119 where it builds up a pressure at the front end of the actuating piston 401, said pressure pushing the piston in the cylinder pipe 403 and out of the cover 301. When the pressurized end of the actuating piston 401 reaches the area of sensor 411, the latter outputs a signal, optionally to a controller, which indicates the position of the actuating piston 401 and thus the operating state of the brake release device 1 and/or a brake device actuated by it. This signal can be used for regulating, controlling and monitoring but also for recording different operating states.

The pressure acting on the actuating piston 401 is maintained by various valves. In order to retract the actuating piston 401, switching valves are actuated which allow the hydraulic medium volume in the cylinder pipe 403 to flow back into the tank body 302, and the actuating piston 401 is moved back into its rest position by external forces (brake spring).

Figure 5A:
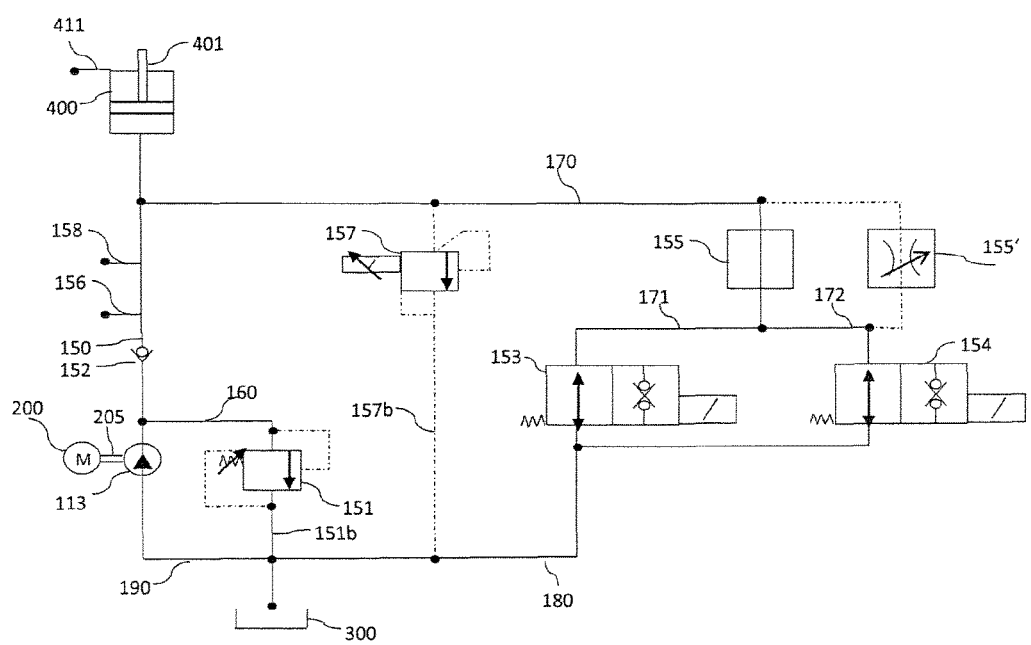
FIG. 5A is a circuit diagram for operating the release device according to the invention.
Figure 5B:
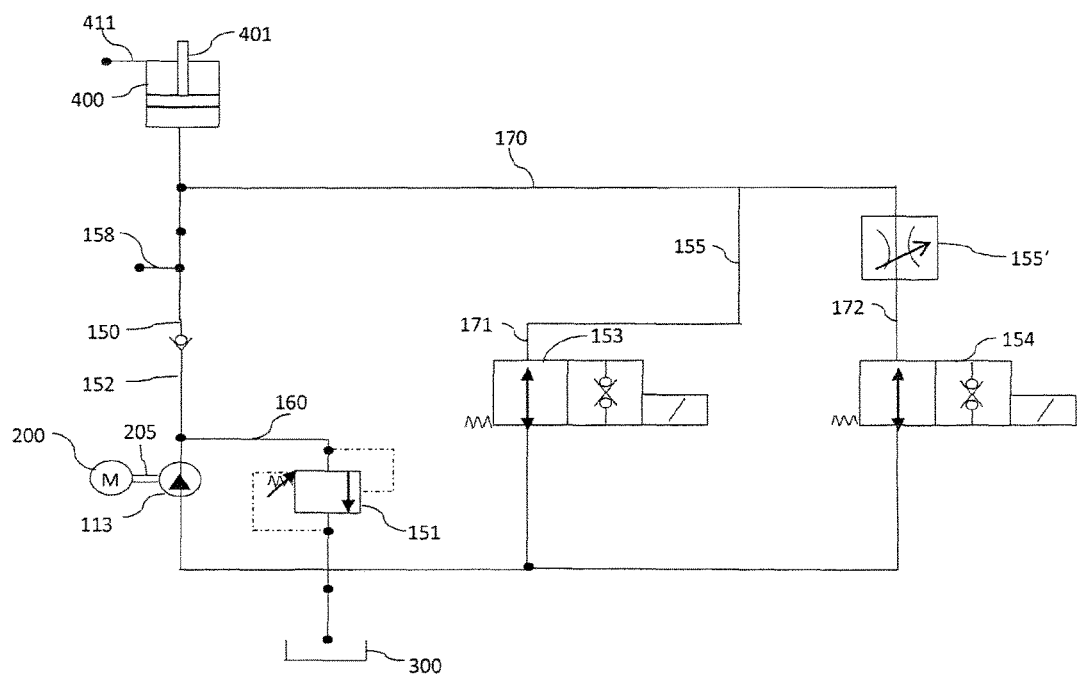
FIG. 5B is a circuit diagram derived from the circuit diagram shown in FIG. 5A.

The hydraulic control necessary for this purpose is now explained by means of FIGS. 5A and 5B, which show a circuit diagram. The electric drive unit 200 is connected to the pump assembly 113 via the drive shaft 205. A hydraulic line 150 extends from the pump assembly to the actuating cylinder arrangement 400. A check valve 152 is coupled between the actuating cylinder arrangement 400 and the pump assembly 113, is pervious in the direction of the actuating cylinder arrangement 400 and locks in the counter direction. The hydraulic line 150 is connected to a pressure limiting valve 151 between the check valve 152 via a branch point 160. A measurement connection 158 and a press key 156 are provided between the check valve 152 and the actuating cylinder arrangement 400.

A branch line 170 passes via a connection 155 which is either made as a free passage or optionally contains a throttle valve 155' (in the dashed branch), via the branches 171 and 172 to the parallel connected, solenoid-actuated 2/2-way valves 153 and 154 opened without current. A return flow 180 flows from the 2/2-way valves into the tank module 300 which is connected to the suction end of the pump assembly 113 via an inlet 190.

When the electric drive unit 200 is operated, the pump assembly 113 is put into operation and conveys hydraulic medium from the tank module 300 through the check valve 152 into the actuating cylinder arrangement 400 where the actuating piston 401 is extended. In this connection, the 2/2-way valves 153 and 154 are solenoid-operated (electrically excited) in their closed, locked position.

The pressure limiting valve 151 here prevents that an excessively high pressure is built up in a continuous operation of the pump assembly. It reduces the pressure when a limit pressure is exceeded and returns the hydraulic medium back into the tank module 300. The check valve 152 prevents the return flow of the hydraulic medium when the electric drive 200 is switched off or when the pump assembly 113 is at a stand-still. The sensor 411 detects the position of the actuating piston and outputs a corresponding signal.

The control is here made via the optional press key 156 which stops the electric drive unit 200 via a controller when an upper limit pressure is exceeded and puts it in operation again when the value drops below a lower limit pressure to keep the effective pressure at the actuating piston 401 constant. The measurement connection 158 serves for checking and monitoring the pump pressure, e.g. via a display or control device which can also be arranged remote from the release device 1. It is arranged in the support 103 in the lateral peripheral area 102 of the central flange 101.

In order to reduce pressure, the 2/2-way valves 153, 154 are made currentless; in doing so, they move in spring-loaded fashion into their open position, the hydraulic medium flows out of the actuating cylinder arrangement 400 through line 170 and 171 as well as 180 back into the tank module 300. The redundant design of the two 2/2-way valves 153 and 154 guarantees that the pressure is reliably reduced even in the case of a functional error of one of the two valves and the braking action blocked by the actuating cylinder arrangement 400 reliably occurs.

Where appropriate, an optionally also adjustable throttle valve 155' is provided instead of the free flow-through 155. As a result, the braking characteristics, i.e. the application speed of the coupled brake system, can be increased or reduced depending on the flow-through cross-section of the throttle valve 155'. It is also possible to more specifically influence the braking action via a proportional pressure limiting valve 157 which operates directly between line 170 and tank module 300 (tank interior 307). The connection 104 is provided for the purpose of support (in FIGS. 1 and 6 closed by a plug). Any braking action profiles can be realized via such a proportional valve and can be assigned via a controller. In connection with a suitable motor management, it is here also possible to realize active braking operations by means of the same brake system. The connection 104 and/or the valve outlet of the employed proportional valve 175 can be connected to the tank interior 307 via line 157*b*.

In the embodiment shown in FIG. 5B, the control of the electric drive 200 and thus of pump 113 is conducted via sensor 411 (without the press key 156) which depending on the position of the actuating piston outputs a corresponding signal to a controller which activates or deactivates the drive 200 in accordance with the piston position.

In the switching operation, the 2/2-way valves 153 and 154 can also be actuated separately. Thus, three different return flow and application speeds can be realized for the brake: When the valve 15 is switched without current (valve 154 remains closed), the full valve cross-section of the valve 153 is available for the return flow (medium return flow/ application speed I).

When the valve 154 is switched without current (valve 153 remains closed), the valve cross-section reduced by the throttle valve 155' upstream of the valve 154 is available for the return flow (low return flow/ application speed II). This return flow can be adjusted by means of throttle valve 155'.

When the valves 153 and 154 are switched without current, both valve cross-sections (full cross-section on valve 153 and reduced (optionally adjustable) cross-section on valve 154 by means of throttle 155') are available (increased return flow/application speed III).

In the embodiment shown in FIG. 5B, the redundant provision of the two 2/2-way valves 153 and 154 also guarantees that in an emergency (e.g. power failure) the pressure is reliably reduced even in the case of a functional failure in one of the two valves and the braking action blocked by the actuating cylinder arrangement 400 reliably occurs.

The hydraulic lines 150, 170, 171, 172, 180, 190 and the supports for the illustrated valves and connections are all formed in one piece in the functional block 100, as shown in FIGS. 4A to F. In the tank-side end face 120 of base 105 there is provided a first valve connection 152*a* for receiving the check valve 152, two second valve connections 153*a* and 154*a* for receiving the 2/2-way valves 153 and 154, a third valve support 151*a* for receiving the pressure limiting valve 151, a fourth valve support 155*a* for receiving the throttle valve 155' which can there be used optionally or alternatively to a flow-through dummy 155. Furthermore, a support 156*a* for receiving the optional press key 156 is provided.

Moreover, a connection 191*b* which is designed as a cable channel passes through the functional block 100, which connects the tank interior 307 to the interior of the electric drive unit 200. Here, the tank side is provided with a support 191*a*, into which a sealing cable passage 191 can be introduced.

In addition, there is a supply line 190 from the tank interior 307, which radially cuts the recess 111 where the pump assembly 113 is disposed so as to provide hydraulic liquid for radial intake. Similarly, the valve supports 153*a* and 154*a*, which receive the 2/2-way valves, are radially connected to the recess 111 via corresponding channels 153*b* and 154*b*. As a result, the hydraulic medium flows indirectly via the recess 111 into the tank connection back into the tank module 300 when the actuating piston 401 is returned.

The pressure limiting valve 151 is connected to the tank interior 307 via a line 151*b* opening into the peripheral surface of base 105. An annular gap between the interior surface of the tank body 302 and the peripheral surface enables an exchange of the hydraulic medium between line 151*b* and the tank interior 307.

The exemplary embodiment in FIGS. 1, 2, 3, 6 and 7 shows a release device 1 where tank module 300 and actuating cylinder arrangement 400 are arranged coaxially in relation to the electric drive unit 200 and the pump assembly 113.

Figure 1A:
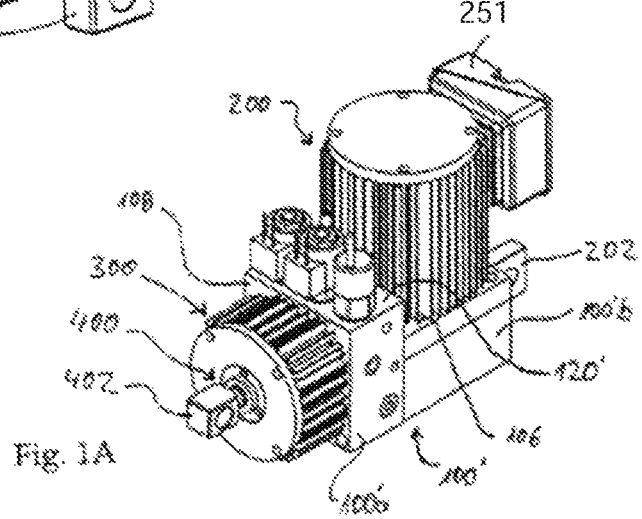
FIG. 1A is a perspective view of an alternative embodiment of a brake release device according to the invention.
Figure 4B:
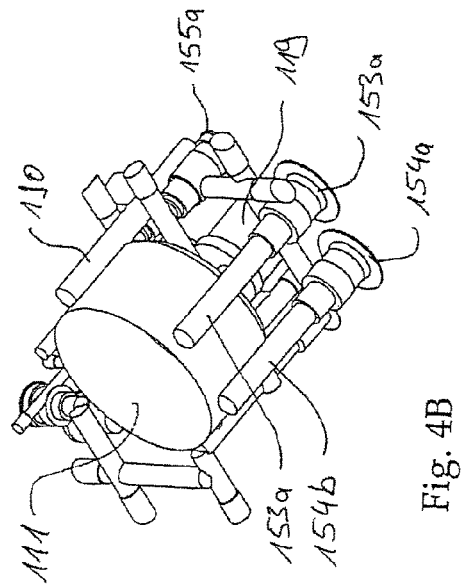
Figure 4A:
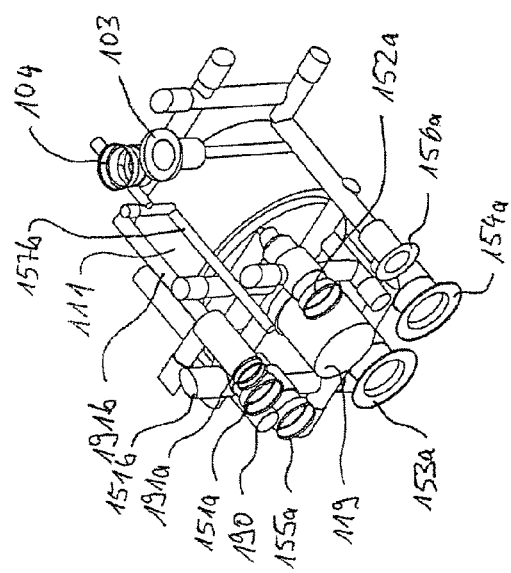
Figure 4C:
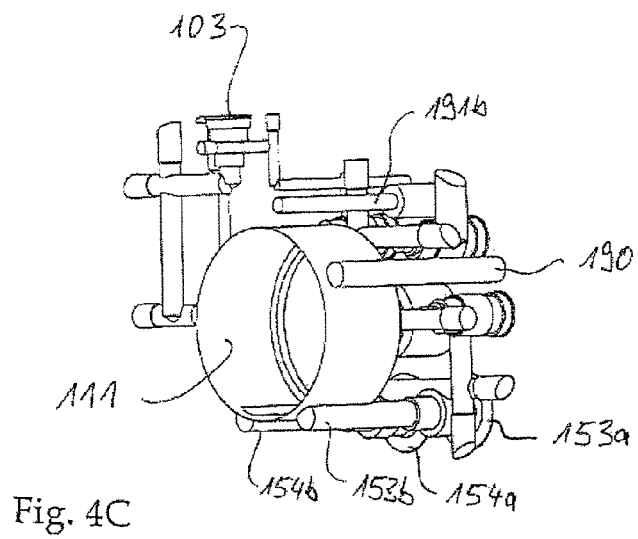
Figure 4D:
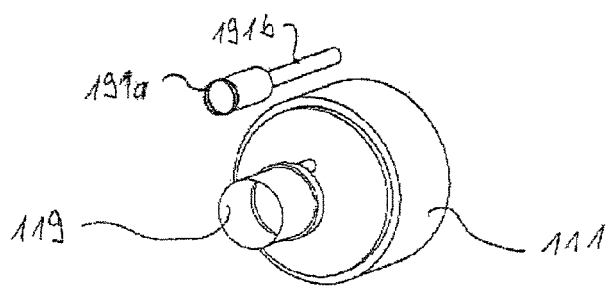

In another embodiment (see FIG. 1A), the drive-side end face 106, which receives the electric drive unit 200 and the pump assembly 113, can also be arranged at an angle, in particular at rights angles to the tank-side end face 108 which carries the actuating cylinder arrangement 400 and the tank module 300. In such an embodiment, the overall length is reduced and the actuating forces are then transmitted via the actuating cylinder arrangement 400, the functional block 100' to corresponding connection means 202 which are then directly attached to the functional block 100'. The functional block 100' is here made of several parts and comprises an actuating block 100'*a* having a connection surface 120', which is provided with corresponding supports for the check valve 152, 2/2-way valves 153, 154, pressure limiting valve 151 and press key 156. A conveyor block 100'*b* carries the electric drive unit 200 and the pump assembly 113. Intersections which correspond to one another are formed in the actuating block 100'*a* and the conveyor block 100'*b*, and therefore the channels of the line arrangement formed in the actuating block 100'*a* and in the conveyor block 100'*b* are coupled to one another.

The following features are also concerned:

A Functional unit (100) for a brake release device, comprising:

a recess (111) for receiving a pump assembly (113), an actuating cylinder support (119) for receiving an actuating cylinder arrangement (400),
wherein the functional unit (100) is formed as an integral functional block where the actuating cylinder support (119), the recess (111) and a plurality of channels (150, 160, 170, 171, 172, 180, 190) for a hydraulic medium are developed, said channels forming a line arrangement.

B Functional unit (100) having a sealing area (109) for connecting a tank module (300), said sealing area surrounding the actuating cylinder support (119).

C Functional unit (100) having a housing connection (107) for receiving a drive housing assembly (203, 201), said housing connection surrounding the recess (111).

D Functional unit (100), wherein a bearing carrier connection (114) for receiving a bearing carrier cover (115) is formed between the housing connection (107) and the recess (111), said bearing carrier connection surrounding the recess.

E Functional unit (100), wherein the actuating cylinder support (119) is formed in a base area (105) of the functional block (100), said base area extending inside the sealing area (109).

F Functional unit (100), wherein the tank module is connected to the recess (111) via a line (190) extending parallel to a main axis (2) and to an exterior surface of the recess (111).

G Functional unit (100), wherein a first valve connection (152a) for receiving a check valve (152) is provided between actuating cylinder support (119) and sealing area (109).

H Functional unit (100), wherein at least one second valve support (153a; 154a) for receiving a 2/2-way valve (153; 154) is provided between the actuating cylinder support (119) and the sealing area (109), said second valve support being connected to the line arrangement.

I Functional unit, wherein the second valve support (153a; 154a) is connected to the recess (111) via a line (153b; 154b) extending parallel to a main axis (2).

K Functional unit (100), wherein a third valve support (151a) for receiving a pressure limiting valve (151) is provided between the actuating cylinder support (119) and the sealing area (109).

L Functional unit (100), wherein a fourth valve support (155a) for receiving a throttle valve (155') is provided between the actuating cylinder support (119) and the sealing area (109).

M Functional unit (100), wherein a press key support (156a) for receiving a press key (156) is provided between the actuating cylinder support (119) and the sealing area (109).

N Functional unit (100), wherein a cable channel (191b) opening between the actuating cylinder support (119) and the sealing area (109) and between the recess (111) and the housing connection (107) passes through the functional unit (100) and a support (191a) for a sealing cable passage (191) is formed on the tank side.

O Brake release device (1) having a functional unit (100).

P Brake arrangement having a brake release device (1).

A person skilled in the art will find further variations and embodiments of the invention in the present disclosure within the scope of the claims.

The invention claimed is:

1. An electrohydraulic brake release device, comprising:
an actuating cylinder arrangement,
a tank module for receiving a hydraulic medium,
an electric drive unit, and
a functional unit having a pump assembly,
wherein the pump assembly is arranged in a recess which is formed in the functional unit and which is in communication with the tank module,
wherein the pump assembly is functionally connected to the actuating cylinder arrangement via a line arrangement and is sealed off from a dry running drive motor of the electric drive unit by means of a bearing carrier cover, and
wherein an outlet of the pump assembly is connected to the actuating cylinder arrangement via a check valve and to the tank module via a connection branching off between check valve and actuating cylinder arrangement and at least one 2/2-way value opened without current.

2. The brake release device according to claim 1, wherein a shaft driving the pump assembly passes through the bearing carrier cover.

3. The brake release device according to claim 2, wherein the bearing carrier cover comprises a bearing arrangement carrying the shaft.

4. The brake release device according to claim 1, in which the functional unit has two end faces, wherein the tank module and the actuating cylinder arrangement are arranged on one end face and the electric drive unit and the pump assembly are arranged on the other end face.

5. The brake release device according to claim 1, in which first and second 2/2-way valves are provided and a throttle element is provided between the actuating cylinder arrangement and between the first and/or second 2/2-way valves.

6. The brake release device according to claim 5, wherein the throttle element has an adjustable flow cross-section.

7. The brake release device according to claim 1, in which the pump assembly is connected to the tank module via a channel branching off between this pump assembly and the check valve and a pressure limiting valve.

8. The brake release device according to claim 1, in which a press key is arranged in operative fashion between the check valve and the actuating cylinder arrangement.

9. The brake release device according to claim 1, wherein the check valve, 2/2-way valve, pressure limiting valve and/or press key are arranged in the tank module.

10. The brake release device according to claim 1, in which control and/or supply lines of the press key and/or the 2/2-way valve are passed through the functional unit into the tank module via the electric drive unit by means of a removable cable passage.

11. A brake arrangement having a brake release device according to claim 1.

12. An electrohydraulic brake release device, comprising:
an actuating cylinder arrangement,
a tank module for receiving a hydraulic medium,
an electric drive unit, and
a functional unit having a pump assembly;
wherein the pump assembly is arranged in a recess which is formed in the functional unit and which is in communication with the tank module;
wherein the pump assembly is functionally connected to the actuating cylinder arrangement via a line arrangement and is sealed off from a dry running drive motor of the electric drive unit by means of a bearing carrier cover;
wherein the functional unit is formed as an integral functional block in which an actuating cylinder support for receiving the actuating cylinder arrangement, the recess and the line arrangement are formed; and wherein the actuating cylinder arrangement is detachably fixed in the actuating cylinder support in force-fit fashion with a cylinder pipe.

13. An electrohydraulic brake release device, comprising:
an actuating cylinder arrangement,
a tank module for receiving a hydraulic medium,
an electric drive unit, and
a functional unit having a pump assembly;
wherein the pump assembly is arranged in a recess which is formed in the functional unit and which is in communication with the tank module; an
wherein the pump assembly is functionally connected to the actuating cylinder arrangement via a line arrangement and is sealed off from a dry running drive motor of the electric drive unit by means of a bearing carrier cover; and
wherein an outlet of the pump assembly is connected to the actuating cylinder arrangement via a check valve and to the tank module via a connection branching off between check valve and actuating cylinder arrangement and at least one 2/2-way value opened without current.

14. The brake release device according to claim 13, in which first and second 2/2-way valves are provided and a throttle element is provided between the actuating cylinder arrangement and between the first and/or second 2/2-way valves.

15. The brake release device according to claim 14, wherein the throttle element has an adjustable flow cross-section.

16. The brake release device according to claim 13, in which the pump assembly is connected to the tank module via a channel branching off between this pump assembly and the check valve and a pressure limiting valve.

17. The brake release device according to claim 13, in which a press key is arranged in operative fashion between the check valve and the actuating cylinder arrangement.

18. The brake release device according to claim 13, wherein the check valve, 2/2-way valve, pressure limiting valve and/or press key are arranged in the tank module.

19. The brake release device according to claim 13, in which control and/or supply lines of the press key and/or the 2/2-way valve are passed through the functional unit into the tank module via the electric drive unit by means of a removable cable passage.

* * * * *